(12) United States Patent
Salvador et al.

(10) Patent No.: US 10,129,714 B2
(45) Date of Patent: Nov. 13, 2018

(54) PUSH NOTIFICATIONS FOR A GATEWAY DEVICE AND ASSOCIATED DEVICES

(71) Applicants: AT&T Mobility II LLC, Atlanta, GA (US); AT&T Intellectual Property I, L.P., Atlanta, GA (US)

(72) Inventors: Andy Salvador, Bellevue, WA (US); Don Philips, Snohomish, WA (US); Kathy X. Liao, Bellevue, WA (US); Michael D. Stice, Atlanta, GA (US); Jennifer S. Swift, Redmond, WA (US); Jim Forbes, Kirkland, WA (US); David Craig, Winston, GA (US); Saritha Bandi, Alpharetta, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/487,653

(22) Filed: Apr. 14, 2017

(65) Prior Publication Data

US 2017/0223513 A1    Aug. 3, 2017

Related U.S. Application Data

(62) Division of application No. 14/663,996, filed on Mar. 20, 2015, now Pat. No. 9,628,971.

(51) Int. Cl.
*H04W 4/00* (2018.01)
*H04W 4/12* (2009.01)
(Continued)

(52) U.S. Cl.
CPC .............. *H04W 4/12* (2013.01); *H04L 67/26* (2013.01); *H04W 48/14* (2013.01); *H04W 68/02* (2013.01); *H04W 84/12* (2013.01); *H04W 88/16* (2013.01)

(58) Field of Classification Search
CPC ....... H04W 4/12; H04W 48/14; H04W 68/02; H04W 84/12; H04W 88/16; H04L 67/26
See application file for complete search history.

(56) References Cited

U.S. PATENT DOCUMENTS 7,821,987 B2  10/2010  Rodriguez et al.
7,860,725 B2  12/2010  Gopinathan
(Continued)

FOREIGN PATENT DOCUMENTS

WO    WO 02/30145    4/2002
WO    WO 2013/000701    1/2013
(Continued)

OTHER PUBLICATIONS

U.S. Office Action dated Jul. 29, 2013 in U.S. Appl. No. 13/086,387.
(Continued)

*Primary Examiner* — Khai M Nguyen
(74) *Attorney, Agent, or Firm* — Hartman & Citrin LLC

(57) ABSTRACT

A gateway device is enabled to initiate sending of push notifications to an associated device. The push notifications can be sent even when a gateway device related application is not running on the device. The push notifications can also be sent to the device whenever it has internet connectivity, even if the internet connectivity is not being provided by the gateway device hotspot. In an embodiment, a mobile access gateway system can receive a notification from the gateway device that is directed to another device. The mobile access gateway system can determine whether or not the gateway device and the other device are related to each other and then instruct a push notification server to send the device a push notification.

20 Claims, 10 Drawing Sheets

(51) Int. Cl.
*H04W 48/14* (2009.01)
*H04W 68/02* (2009.01)
*H04L 29/08* (2006.01)
*H04W 84/12* (2009.01)
*H04W 88/16* (2009.01)

(56) References Cited

U.S. PATENT DOCUMENTS

| | | |
|---|---|---|
| 8,364,148 B2 | 1/2013 | Dravida et al. |
| 8,405,502 B2 | 3/2013 | Teague |
| 8,488,541 B2 | 7/2013 | Schlack |
| 8,565,204 B2 | 10/2013 | Kalhan |
| 8,630,272 B2 | 1/2014 | Park et al. |
| 8,831,517 B2 | 9/2014 | Shankaranarayanan et al. |
| 8,948,728 B2 | 2/2015 | Haberman |
| 9,088,672 B2 | 7/2015 | Shankaranarayanan et al. |
| 9,628,971 B2* | 4/2017 | Salvador .................. H04W 4/20 |
| 2002/0173704 A1 | 11/2002 | Schulze et al. |
| 2004/0053599 A1 | 3/2004 | Karaoguz et al. |
| 2004/0077374 A1 | 4/2004 | Terry |
| 2004/0193684 A1 | 9/2004 | Ben-Yoseph |
| 2006/0031515 A1 | 2/2006 | Van Gassel |
| 2006/0172769 A1 | 8/2006 | Oh |
| 2007/0032225 A1 | 2/2007 | Konicek |
| 2007/0124809 A1 | 5/2007 | Narin et al. |
| 2008/0033802 A1 | 2/2008 | McKenna |
| 2008/0058614 A1 | 3/2008 | Banet |
| 2008/0146277 A1 | 6/2008 | Anglin |
| 2009/0005005 A1 | 1/2009 | Forstall et al. |
| 2009/0125413 A1 | 5/2009 | Chevalier |
| 2009/0177996 A1 | 7/2009 | Hunt |
| 2010/0017471 A1 | 1/2010 | Brown |
| 2010/0205099 A1 | 8/2010 | Ahmavaara et al. |
| 2010/0227585 A1 | 9/2010 | Carroll |
| 2010/0227632 A1* | 9/2010 | Bell .................... H04L 12/1859 455/466 |
| 2010/0274805 A9* | 10/2010 | Tanabe .................... H04W 4/02 707/770 |
| 2011/0055901 A1 | 3/2011 | Karaoguz et al. |
| 2011/0087782 A1 | 4/2011 | Bouckaert et al. |
| 2011/0098059 A1* | 4/2011 | Qiu ...................... H04W 4/023 455/456.2 |
| 2011/0294502 A1 | 12/2011 | Oerton |
| 2012/0054353 A1 | 3/2012 | Jung et al. |
| 2012/0079043 A1 | 3/2012 | Brown et al. |
| 2012/0116886 A1 | 5/2012 | Manku |
| 2012/0155380 A1 | 6/2012 | Hodges |
| 2012/0264375 A1 | 10/2012 | Shankaranarayanan |
| 2013/0219471 A1 | 8/2013 | Brown et al. |
| 2013/0238473 A1 | 9/2013 | Fan et al. |
| 2013/0242969 A1 | 9/2013 | Schlack |
| 2013/0272227 A1 | 10/2013 | Gallagher et al. |
| 2013/0272228 A1 | 10/2013 | Gallagher et al. |
| 2013/0273956 A1 | 10/2013 | Gallagher et al. |
| 2013/0331028 A1 | 12/2013 | Kuehnel et al. |
| 2015/0250021 A1 | 9/2015 | Stice et al. |
| 2015/0319804 A1 | 11/2015 | Shankaranarayanan et al. |
| 2016/0095017 A1* | 3/2016 | Ely .......................... H04W 4/80 455/454 |
| 2017/0251071 A1* | 8/2017 | Kenjo ..................... H04L 67/26 |

FOREIGN PATENT DOCUMENTS

| | | |
|---|---|---|
| WO | WO 2013/095382 | 6/2013 |
| WO | WO 2013/147823 | 10/2013 |

OTHER PUBLICATIONS

U.S. Office Action dated Dec. 13, 2013 in U.S. Appl. No. 13/086,387.
U.S. Notice of Allowance dated Apr. 28, 2014 in U.S. Appl. No. 13/086,387.
U.S. Office Action dated May 6, 2015 in U.S. Appl. No. 14/193,356.
U.S. Notice of Allowance dated Dec. 15, 2015 in U.S. Appl. No. 14/193,356.
U.S. Notice of Allowance dated Mar. 12, 2015 in U.S. Appl. No. 14/448,312.
U.S. Office Action dated Jun. 10, 2016 in U.S. Appl. No. 14/663,996.
U.S. Notice of Allowance dated Dec. 5, 2016 in U.S. Appl. No. 14/663,996.
U.S. Office Action dated Oct. 1, 2015 in U.S. Appl. No. 14/753,089.
U.S. Notice of Allowance dated Feb. 10, 2016 in U.S. Appl. No. 14/753,089.
ISR and WO dated Jun. 9, 2015 in PCT Application No. PCT/US2015/017752.
"Surface blades: Microsoft bets on accessories as the future of tablets," Sep. 24, 2013, retrieved from http://www.theverge.com/2013/9/24/4765048/can-microsofts-futuristic-blade-accessories-give-the-surface-the-edge on Feb. 19, 2014.
"IMEC: 7Gbit/s 60GHz wireless transceiver for tablets," May 2012, retrieved from http://www.electronicsweekly.com/news/design/communications/imec-7gbits-60ghz-wireless-transceiver-for-tablets-2012-05/ on Feb. 19, 2014.
"Sierra Wireless outs thinnest-ever 4G LTE module, teases skinny AT&T-ready laptops and tablets," Jun. 7, 2012, retrieved from http://www.engadget.com/2012/06/07/sierra-wireless-em7700-4g-lte-module/ on Feb. 19, 2014.
"Wireless Accessory Kit," 2012, retrieved from https://store.wacom.com/us/en/product/ACK40401 on Feb. 19, 2014.
"Sierra Wireless launches new generation 4G LTE modules for notebooks and tablets," Feb. 4, 2014, retrieved from http://www.sierrawireless.com/en/Newsroom/newsreleases/2014/020414-Sierra_Wireless_launches_new_generation_4G_LTE_modules_for_notebooks_and_tablets.aspx on Feb. 19, 2014.
"Wi-Fi Direct—Wikipedia, the free encyclopedia," retrieved from https://en.wikipedia.org/w/index.php?title=Wi-Fi_Direct&oldid=463375983, dated Nov. 30, 2011.
U.S. Office Action dated Jan. 8, 2018 in U.S. Appl. No. 15/268,664.
Shaw, Keith, "PROTECT: Cases for your smartphone or tablet," Networkworld, Nov. 19, 2012.

* cited by examiner

US 10,129,714 B2

PUSH NOTIFICATIONS FOR A GATEWAY DEVICE AND ASSOCIATED DEVICES

CROSS-REFERENCE TO RELATED APPLICATION

This application is a divisional of and claims priority to U.S. patent application Ser. No. 14/663,996, entitled "Push Notifications for a Gateway Device and Associated Devices," filed Mar. 20, 2015, now U.S. Pat. No. 9,628,971, which is incorporated herein by reference in its entirety.

TECHNICAL FIELD

The subject disclosure relates to a system that enables push notifications to be sent to devices that are associated with a gateway device in a mobile communications environment.

BACKGROUND

Devices that are Wi-Fi enabled or have mobile communication technologies other than a cellular connection can be at a disadvantage when there is no Wi-Fi (or other technology) network present. Gateway devices that are cellular enabled can provide mobile hotspots to allow the Wi-Fi-enabled devices to access the Internet. Managing access to the mobile hotspots to authorized users can be difficult though, especially when there may be multiple gateway devices present. Additionally, notifications and messages sent between the gateway device and the Wi-Fi enabled devices may require an application to be running in order for the notifications to be seen. In some operating systems, applications may not be allowed to run in the background.

DETAILED DESCRIPTION

Figure 1:
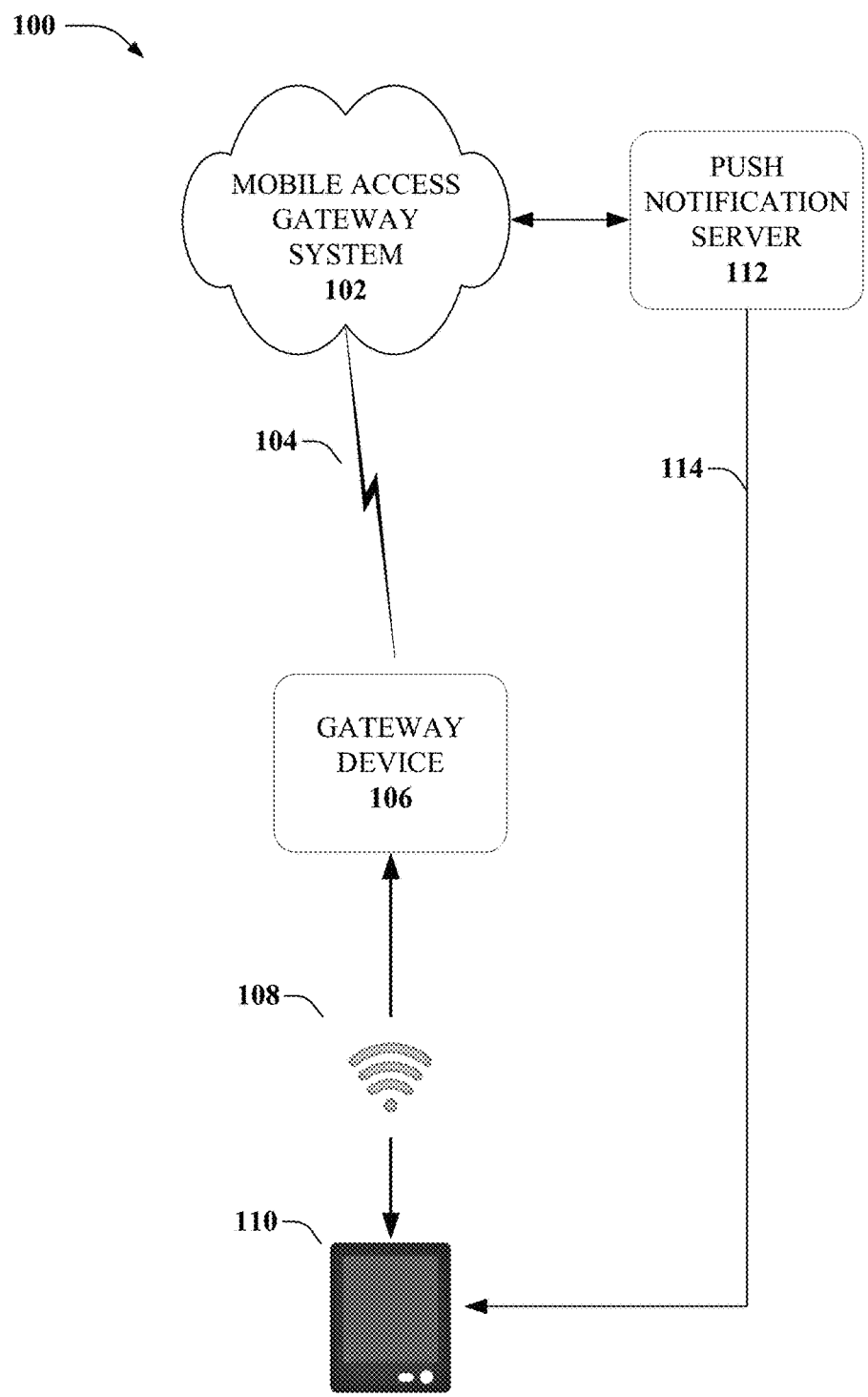
FIG. 1 is an example, non-limiting embodiment of a block diagram showing a system for sending push notifications to a computing device associated with a gateway device in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

A system is provided to allow push notifications to be sent to a user device associated with a gateway device. The push notifications can be sent even when a gateway device related application is not running on the device. The push notifications can also be sent to the device whenever it has internet connectivity, even if the internet connectivity is not being provided by the gateway device hotspot. In an embodiment, a mobile access gateway system can receive a notification from the gateway device that is directed to another device. The mobile access gateway system can determine whether or not the gateway device and the other device are related to each other and then instruct a push notification server to send the device a push notification.

In an embodiment, mobile access gateway system can determine which user device to send the push notification to based on identifying information in the notification from the gateway device. The notification can include the mobile number associated with the gateway device, and the mobile access gateway system can look up to determine which non-mobile (i.e., non-gateway or non-cellular enabled) user devices are associated with the mobile number, and then send the push notification to one or more of those non-mobile user devices via the push notification server. In an embodiment, the mobile access gateway system can receive from the device information indicating to which gateway device the user device is associated with. The identifying information can include a device ID that the mobile access gateway system can match to a mobile number.

In another embodiment, a user device can connect to the gateway device using an authorization code. The authorization code can include both a passcode and information indicating a wireless network. In this way, a person that wants to connect their device to a wireless hotspot provided by the gateway device needs to only enter a single authorization code, and the user device can automatically determine which wireless network to connect to, and the passcode will enable access to that wireless network. This can be particularly useful for user devices where it may not be easy, or even possible, to lookup a list of wireless network service set identifications (SSIDs), and then select to join one of the wireless networks.

It is to be appreciated that while Wi-Fi is mentioned throughout this specification, the embodiments are not limited to Wi-Fi, and that various short to medium range data communication technologies can be implemented, including but not limited to Wi-Fi IEEE 802.11a/b/g/n/ac and etc., WiMAX IEEE 802.16, Bluetooth, and a variety of other communications technologies and protocols.

For these considerations as well as other considerations, in one or more embodiments, a mobile access gateway system can include a processor and a memory that stores executable instructions that when executed by the processor, facilitate the performance of operations. The operation can include receiving a notification request from a gateway device via a radio access network, wherein the notification request comprises a request to send information to a device. The operations can also include determining that the gateway device is associated with the device. The operations can also include initiating sending of a push notification comprising the information to the device.

In another embodiment, a method can include receiving, by a system comprising a processor, an alert from a hotspot device via a radio access network device, wherein the alert comprises a code indicating update information about a status of the hotspot device and identification information identifying the hotspot device. The method can also include determining, by the system, a device that is associated with the hotspot device based on the identification information. The method can further include sending, by the system, a request to a server to send a push notification comprising the code to the device.

In yet another embodiment, a computer-readable storage device storing executable instructions that, in response to execution, cause a system comprising a processor to perform operations. The operations can include receiving an alert from a hotspot device via a radio access network device, wherein the alert comprises a code indicating update information about a status of the hotspot device and identification information identifying the hotspot device. The operations can also include detecting a relationship between the device and the hotspot device based on the identification information and match data. The operations can further include sending a request to a push notification server to send a push notification comprising the code to the device.

Turning now to FIG. 1, illustrated is an example, non-limiting embodiment of a block diagram 100 showing a system for sending push notifications to a computing device 110 associated with a gateway device 106 in accordance with various aspects described herein.

In an embodiment, the gateway device 106 can provide a wireless hotspot 108 that provides the user device 110 with internet connectivity or connectivity to a packet based network, internet protocol or not. The user device 110 can be a Wi-Fi enabled device or can include a mobile communications technology other than Wi-Fi such as Bluetooth or other communications protocols. In an embodiment, the user device 110 can be a personal computer, hand-held computing device (e.g., PDA, phone, watch, tablet computer, netbook computer, . . . ), microprocessor-based or programmable consumer or industrial electronic including appliances and robotic devices.

During times when the user device 110 does not have access to a fixed, broadband enabled Wi-Fi connection, the gateway device 106 can provide Wi-Fi hotpot enabled by a radio access network connection (3G, 4G, LTE, etc.) 104 to a mobile network. In an embodiment, the gateway device 106 can be a fixed or moveable device. The gateway device 106 can take a variety of form factors including being a case for a tablet device.

In an embodiment, the gateway device 106 may occasionally need to send a notification to the user device 110. Since the gateway device 106 may or may not have a display, status updates regarding the gateway device 106 may need to be sent to the user device 110 to inform the user. Such status updates can include alerts indicating to the user that the battery level of the gateway device 106 is below a certain level. The status updates can also indicate the signal strength of the cellular connection that the gateway device 106 has with the mobile network. The status updates can also indicate that firmware updates are available, that the gateway device 106 has reached a data usage limit, that account messages have been received, that the gateway device 106 is roaming, and other update information. In other embodiments, these alerts could include other information which could be dynamic (e.g., location, time of day, speed, temperature, etc.) derived from the gateway device 106, network elements (e.g., location server, message server, etc.) or an external data source.

In an embodiment, the gateway device 106 can send the alerts to the user device 110 through an application interface on the user device 110. The application interface may not be running however, and so the gateway device 106 may not be able to directly send the updates and notifications to the user device 110. In those cases then, the gateway device 106 can send a notification request to a mobile access gateway system 102 in the cloud. The mobile access gateway system 102 can include components which manage billing and other account services, but the mobile access gateway system 102 can also initiate sending a push notification 114 to the user device 110 via a push notification server 112.

The notification request sent by the gateway device 106 to the mobile access gateway system 102 can include a mobile number associated with the gateway device 106 in addition to the status update information. The mobile access gateway system 102 can look up the mobile number and find devices (e.g., the user device 110) that are associated with the mobile number and then request that push notification server 112 sends the push notification 114 with the status update to the user device 110. In an embodiment, the notification request received from the gateway device 106 can also include a device ID identifying the user device 110. The mobile access gateway system 102 can then verify that the mobile number associated with the gateway device 106 and the device ID match, or are properly associated with each other before allowing push notification server 112 to send the push notification 114.

In an embodiment, the status update can take the form of a code that can then be interpreted by the user device 110 or an application running on the user device 110. In an embodiment, the code can be a 3 or 4 digit code, with different meanings associated with various combinations of numbers. This shorthand is enabled as push services may only allow very short messages.

In an embodiment, the notification request can initiate at the mobile access gateway system 102. In such an embodiment, the notification can be related to billing and account services, and other types of status updates that may not be associated with the gateway device 106.

In an embodiment, the push notification 114 can be sent via the Wi-Fi hotspot 108 provided by the gateway device 106. In other embodiments, the push notification 114 can be sent via other wireless or wired networks that the user device 110 may be connected to.

It is to be appreciated that the term mobile number is not necessarily limited to being a mobile phone number. In some embodiments, mobile number can refer to a Mobile Station International Subscriber Directory Number (MSISDN) or an International Mobile Subscriber Identity (IMSI) number. In other embodiments, other uniquely identifying numbers are possible.

Figure 2:
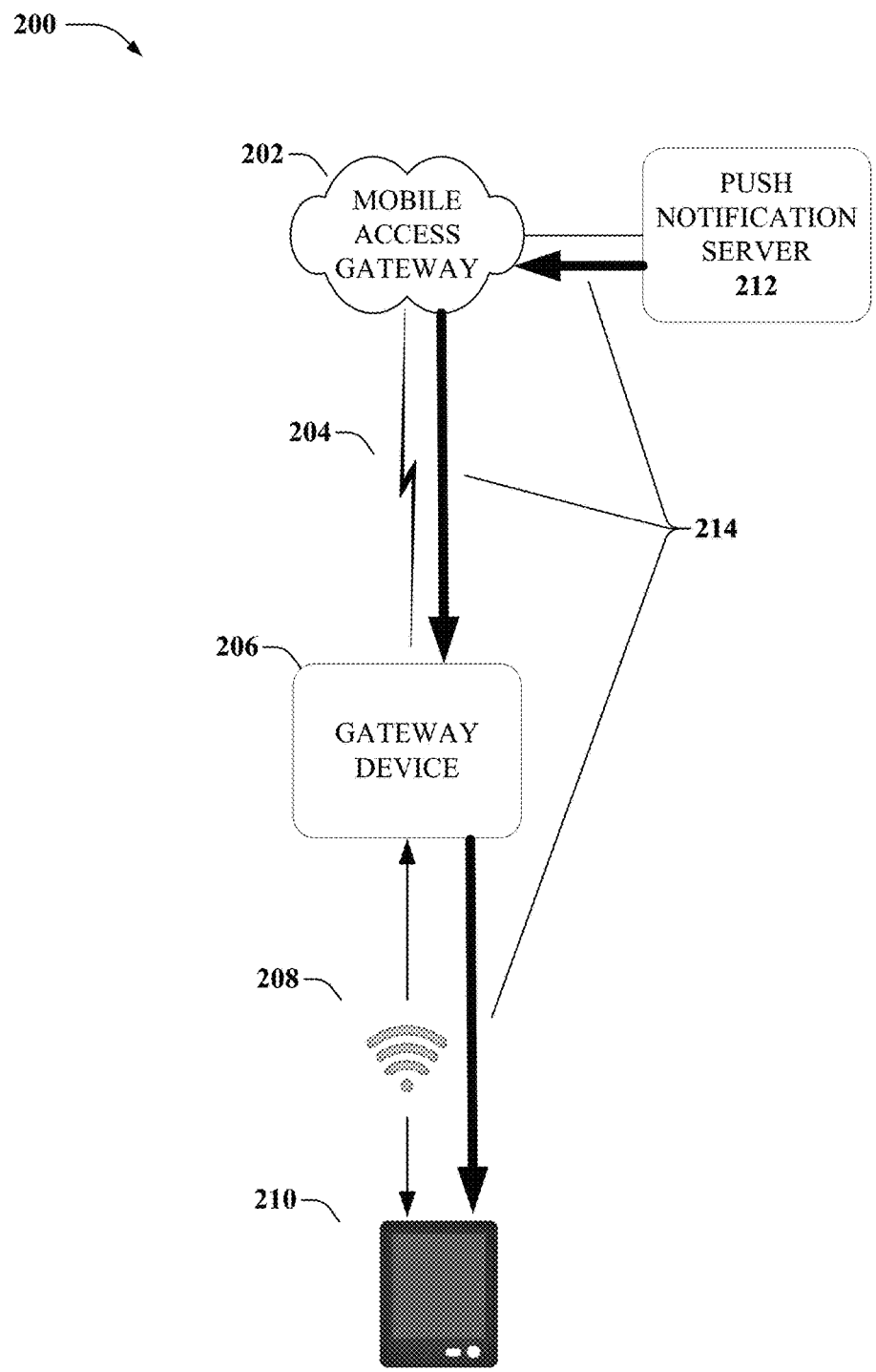
FIG. 2 is an example, non-limiting embodiment of a block diagram showing a system for sending push notifications to a computing device associated with a gateway device in accordance with various aspects described herein.

Turning now to FIG. 2, illustrated is an example, non-limiting embodiment of a block diagram 200 showing a system for sending push notifications to a computing device 210 associated with a gateway device 206 in accordance with various aspects described herein.

In an embodiment, the gateway device 206 can provide a wireless hotspot 208 that enables a user device 210 to have access to a packet based network or the Internet. The user device 210 can be a Wi-Fi enabled device or can include a mobile communications technology other than Wi-Fi such as Bluetooth or other communications protocols. In an embodiment, the user device 210 can be a personal computer, hand-held computing device (e.g., PDA, phone, watch, tablet computer, netbook computer, . . . ), microprocessor-based or programmable consumer or industrial electronic including appliances and robotic devices.

During times when the user device 210 does not have access to a regular Wi-Fi connection, the gateway device 106 can provide a Wi-Fi hotspot 208 enabled by a radio access network connection (3G, 4G, LTE, etc.) 204 to a mobile network. In an embodiment, the gateway device 206 can be a fixed or moveable device. The gateway device 206 can take a variety of form factors including being a case for a tablet device or a standalone device among other form factors.

In an embodiment, the gateway device 206 may occasionally need to send a notification to the user device 210. Since the gateway device 206 may or may not have a display, status updates regarding the gateway device 206 may need to be sent to the user device 210 to inform the user. Such status updates can include alerts indicating to the user that the battery level of the gateway device 206 is below a certain level. The status updates can also indicate the signal strength of the cellular connection that the gateway device 206 has with the mobile network. The status updates can also indicate that firmware updates are available, that the gateway device 206 has reached a data usage limit, that account messages have been received, that the gateway device 206 is roaming, and other update information. In other embodiments, these alerts could include other information which could be dynamic (e.g., location, time of day, speed, temperature, etc.) derived from the gateway device 206, network elements (e.g., location server, message server, etc.) or an external data source.

In an embodiment, the gateway device 206 can send the alerts to the user device 210 through an application interface on the user device 210. The application interface may not be running however, and so the gateway device 206 may not be able to directly send the updates and notifications to the user device 210. In those cases then, the gateway device 206 can send an alert to a mobile access gateway system 202 in the cloud. The mobile access gateway system 202 can include components which manage billing and other account services, but the mobile access gateway system 202 can also initiate sending a push notification 214 to the user device 210 via a push notification server 212.

The alert by the gateway device 206 to the mobile access gateway system 202 can include status update information as well as a device ID associated with the user device 210. The mobile access gateway 202 can then determine whether the device ID and a mobile number associated with the gateway device 206 match or are related to each other, and can then request that the push notification server 212 send the push notification 214 with the status update to the user device 210 via the mobile access gateway 202, the radio access network connection 204, and the gateway device 206.

In an embodiment, the status update sent by the gateway device 206 can take the form of a code that can then be interpreted by the user device 210 or an application running on the user device 210. In an embodiment, the code can be a 3 or 4 digit code, with different meanings associated with various combinations of numbers. This shorthand is enabled as push services may only allow very short messages. In another embodiment, the mobile access gateway 202 can receive an alert with a status update from the gateway device 206 and translate the status update to a numeric code that is then included in the push notification 214 sent by the push notification server 212.

In an embodiment, the status update can initiate at the mobile access gateway system 202. In such an embodiment, the notification can be related to billing and account services, and other types of status updates that may not be associated with the gateway device 206.

Figure 3:
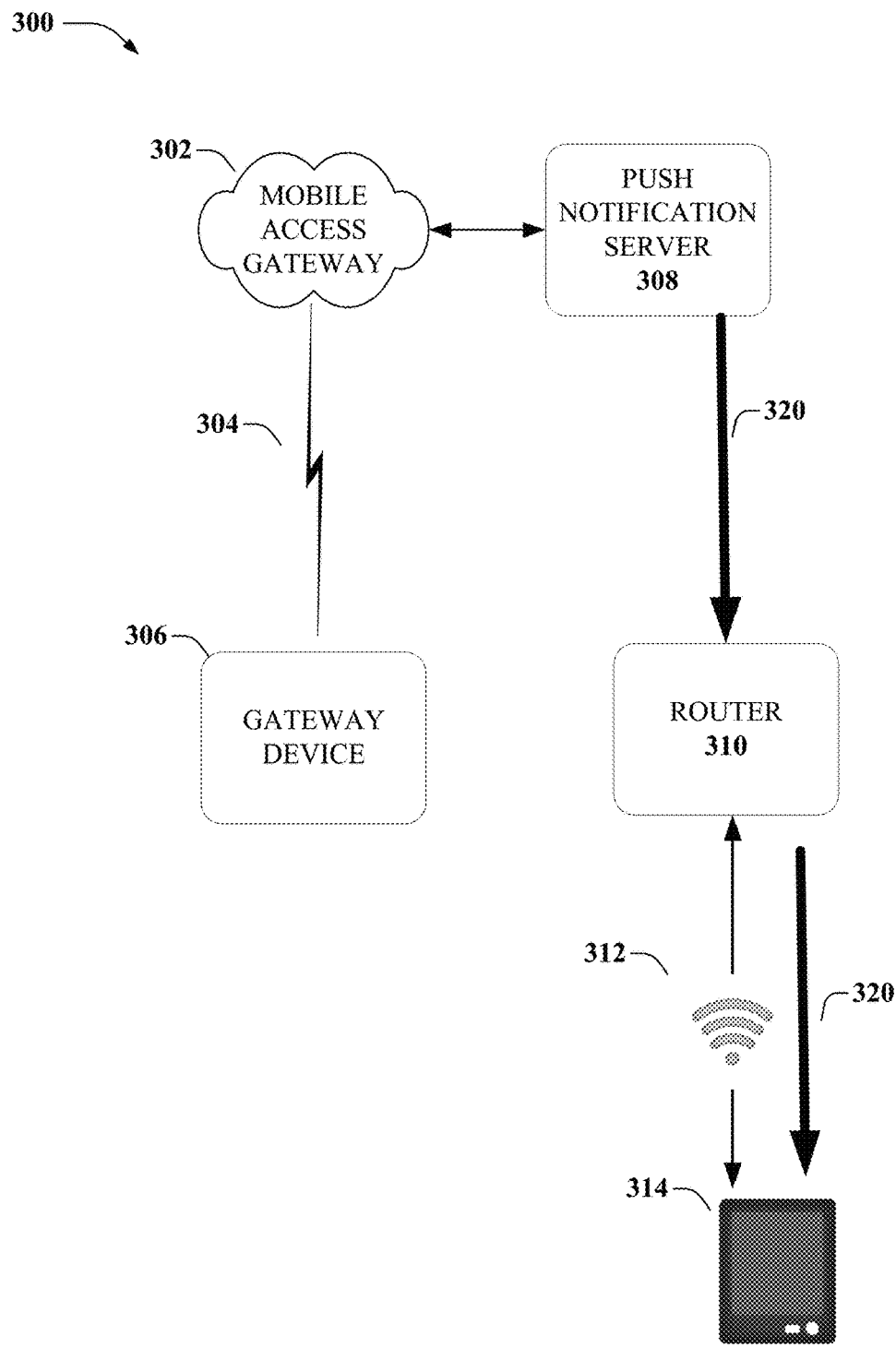
FIG. 3 is an example, non-limiting embodiment of a block diagram showing a system for sending push notifications to a computing device associated with a gateway device in accordance with various aspects described herein.

Turning now to FIG. 3, illustrated is an example, non-limiting embodiment of a block diagram 300 showing a system for sending push notifications to a user device 314 associated with a gateway device 306 in accordance with various aspects described herein. In the embodiment shown in FIG. 3, push notifications can originate from the gateway device 306 or from a mobile access gateway 302 even when the user device 314 is not connected to a wireless hotspot provided by the gateway device 306, but is instead connected to a wireless network 312 provided by another wireless access point such as a router 310.

In an embodiment, the gateway device 306 can send an alert to the user device 314 by sending an alert or notification request to a mobile access gateway via a cellular connection 304. The alert request by the gateway device 306 to the mobile access the gateway system 302 can include status update information as well as a device ID associated with the user device 314. The mobile access gateway 302 can then determine whether the device ID and a mobile number associated with the gateway device 306 match or are related to each other, and then can request that the push notification server 308 send the push notification 320 with the status update to the user device 314 via a router 310 and the wireless network 312 that is not related to the gateway device 306. This can allow the gateway device 306 to send alerts or notifications to the user device 314 even when the user device 314 may not be located anywhere near the gateway device 306.

Figure 4:
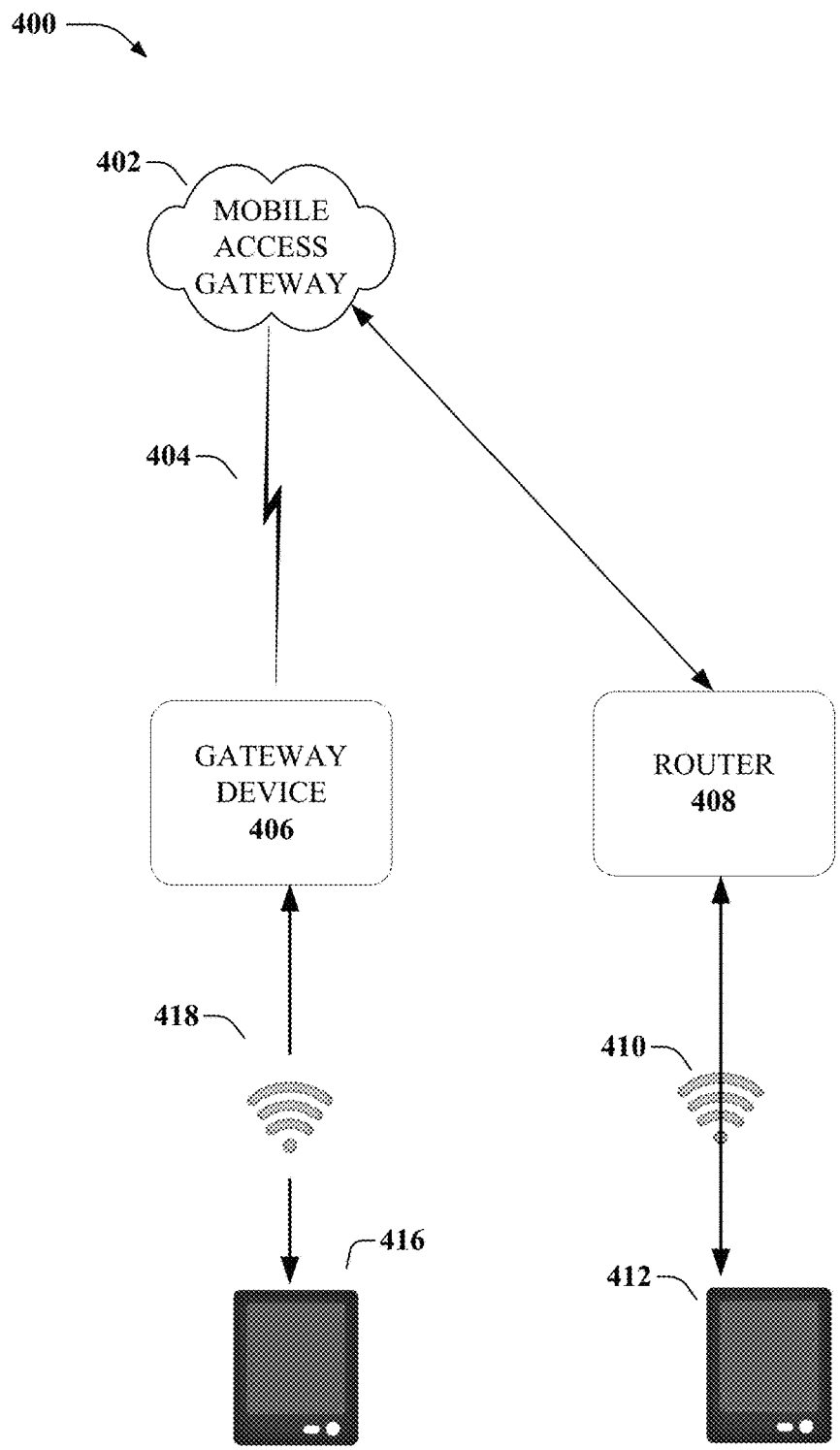
FIG. 4 is an example, non-limiting embodiment of a block diagram showing a system for sending instructions to a gateway device from a computing device associated with the gateway device in accordance with various aspects described herein.

Turning now to FIG. 4, illustrated is an example, non-limiting embodiment of a block diagram 400 showing a system for sending instructions to a gateway device 406 from a computing device such as a user device 412 associated with the gateway device 406 in accordance with various aspects described herein.

In an embodiment, the mobile access gateway 402 can enable instructions to be sent from a user device 412 to a gateway device 406 when the user device 412 is connected to a wireless network 410 provided by a device (e.g., router 408) other than the gateway device 406. The user device 412 can issue the instruction, and the router 408 can pass the instruction to a mobile access gateway 402. The instruction can include the device ID of the user device 412 and a mobile number associated with the gateway device 406. Using the device ID and the mobile number, the mobile access gateway 402 can determine whether the gateway device 406 and the user device 412 are related with each other (e.g., whether the user device 412 has previously or is currently authorized to use the wireless hotspot 418 provided by the gateway device 406), and if they are related, then the mobile access gateway 402 will forward the instruction to the gateway device 406.

The instruction can include commands to turn the gateway device 406 off, or commands to provide the user device 412 with status updates or location information. In an embodiment, the instruction may even be directed at another device associated with the gateway device 406 (e.g., the device 416).

In other embodiments, the user device 416 can also send instructions or notifications to the gateway device 406 without having to go through the mobile access gateway 402. In other embodiments, the user device 416 can also send instructions or notifications to the user device 412 via the mobile access gateway 402.

Figure 5:
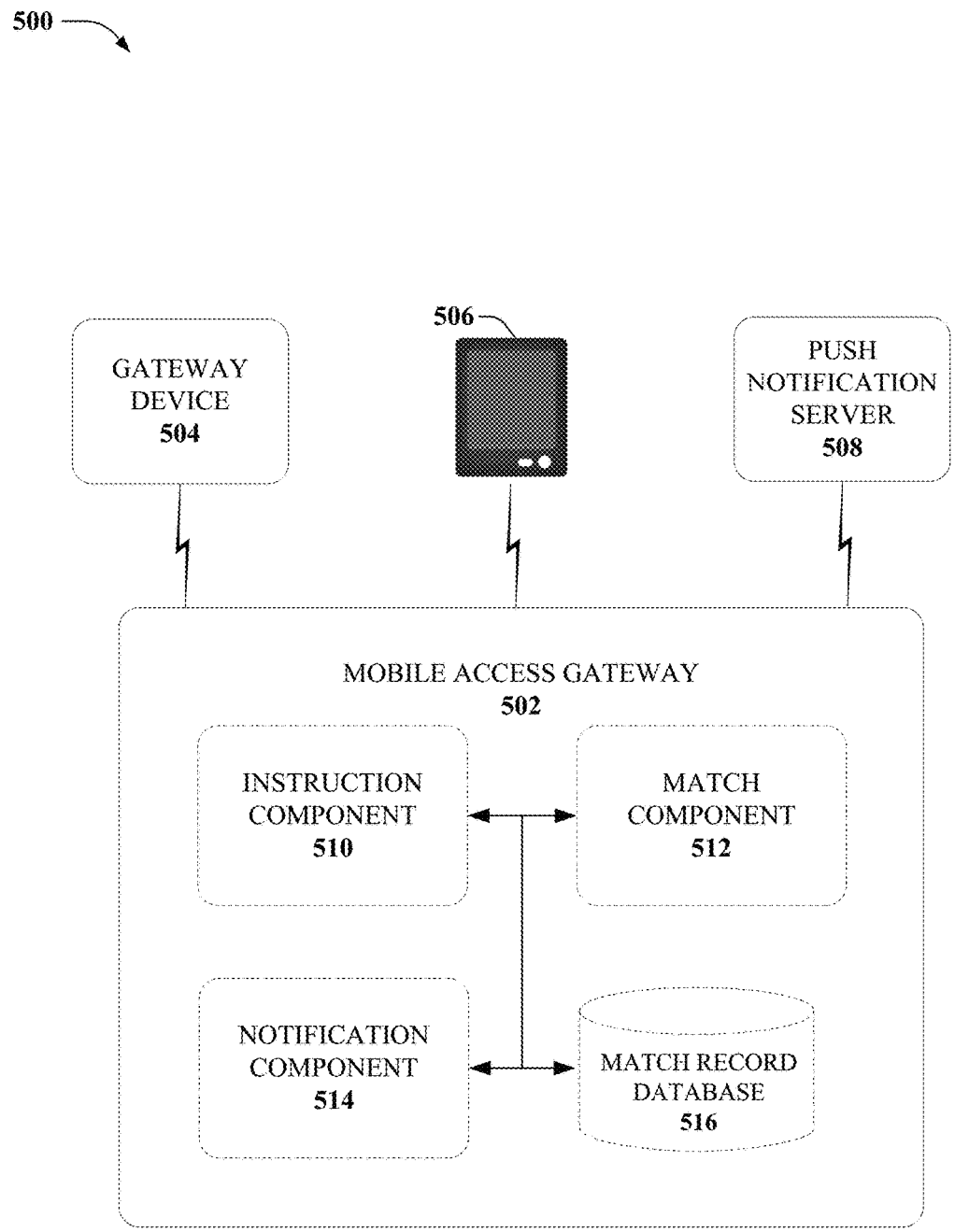
FIG. 5 is an example, non-limiting embodiment of a block diagram showing a mobile access gateway system in accordance with various aspects described herein.

Turning now to FIG. 5, illustrated is an example, non-limiting embodiment of a block diagram 500 showing a mobile access gateway system 502 in accordance with various aspects described herein. The mobile access gateway system 502 can receive notification requests from a gateway device 504 with status updates for a user device (e.g., the user device 506). The mobile access gateway system 502 can then verify that the gateway device 504 and the user device 506 are associated with each other and then initiate sending of a push notification to the user device 506 via the push notification server 508.

A notification component 514 on the mobile access gateway system 502 can receive the notification request from the gateway device 504. The notification component 514 can provide a match component 512 with the mobile number associated with the notification request. The match component 512 can look through a match record database to determine which devices are associated with the gateway device 504 based on the mobile number, and then upon finding a match, the instruction component 510 can send an instruction or request to the push notification server 508 to send the push notification to the user device 506.

In an embodiment, the mobile access gateway system 502 can also receive an instruction from the user device 506 to send to the gateway device 504, and the match component 512 can determine based on a mobile number and/or device ID associated with the instruction whether or not the user device 506 and the gateway device 504 are matched.

In an embodiment, the match component 512 can update the match record database 516 with new associations between user devices and gateway devices. For instance, if the user device 506 connects for the first time to the gateway device 504 by entering an authorization code, the user device 506 can send an update to the match component 512 indicating that the authorization code was successful. Based on the authorization code, the device ID of the gateway device 504 can be determined, and the mobile number and device ID of the gateway device can be associated with the device ID of the user device 506.

The device ID of the gateway device 504 can be determined from the authorization code used by the user device 506 based on an algorithm applied to the authorization code. For instance, if the authorization code is an 8 digit long passcode: 12345678, the device ID of the gateway device 504 can be indicated by the second, fourth, sixth, and eighth digits, "2468" of the authorization code. In some embodiments, the authorization code can also include one or more letters in front of the passcode which indicate a make and model of the gateway device. In other embodiments, other algorithms to determine the device ID are possible.

Figure 6:
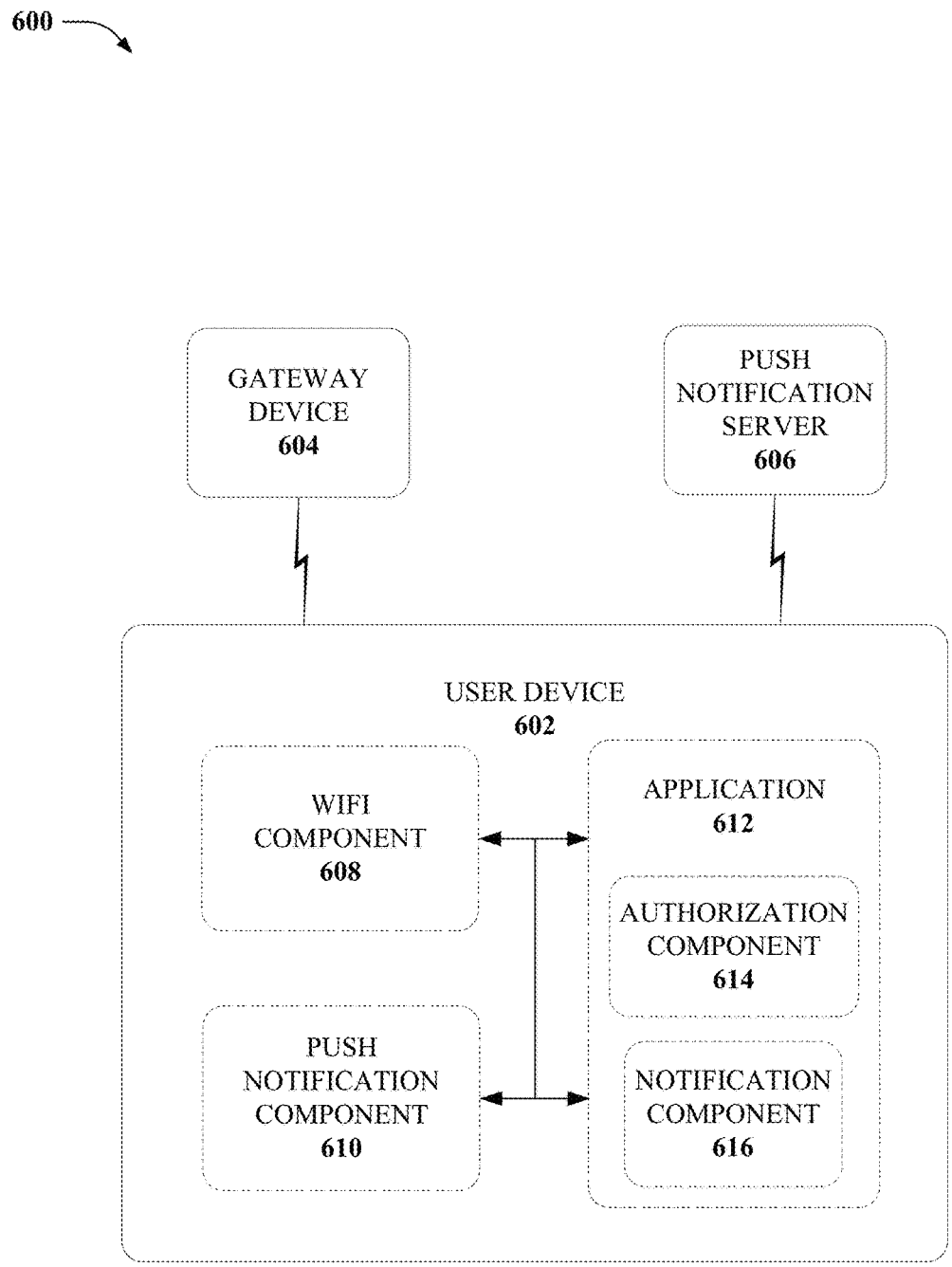
FIG. 6 is an example, non-limiting embodiment of a block diagram showing a user device in accordance with various aspects described herein.

Turning now to FIG. 6, illustrated is an example, non-limiting embodiment of a block diagram showing a user device 602 in accordance with various aspects described herein.

The user device 602 can connect to a wireless hotspot provided by a gateway device 604. Before the Wi-Fi component 608 on the user device 602 connects to the wireless network however, the an application 612 configured to manage access to the gateway device 604 can include a authorization component 614 that facilitates providing access to the wireless hotspot provided by the gateway device 604. Normally, when connecting to a wireless hotspot, a user must select which wireless network they wish to connect to, based on the SSID of the wireless network. Once the wireless network is selected, a password or passcode may be required to connect to the wireless network. In embodiments herein however, it is not necessary to choose which wireless network to connect to, as a single authorization code entered by a user contains information that allows the authorization component 614 to select which wireless network to join, and provides the passcode to authorize the user device 602. The authorization code can simply be a passcode, and the authorization component 614 can determine the wireless network from the passcode, or in other embodiments, the authorization code.

In an embodiment, upon successfully connecting to the wireless hotspot provided by the gateway device 604, the application 612 can send a match record update to a mobile access gateway (e.g., the mobile access gateway system 502) updating a match record database (e.g., the match record database 516) so that the mobile access gateway will know that the user device 602 and the gateway device 604 are related.

In an embodiment, the user device 602 can also receive push notification from the gateway device 604 via a push notification server 606. When the push notification component 610 receives the push notification, the push notification component 610 can alert the user via an alert notification on the user device 602. The push notification component 610 can also notify the notification component 616 in the application 612 that a notification has been received. The notification component 616 can translate a code sent with the push notification into a status update.

Figure 7:
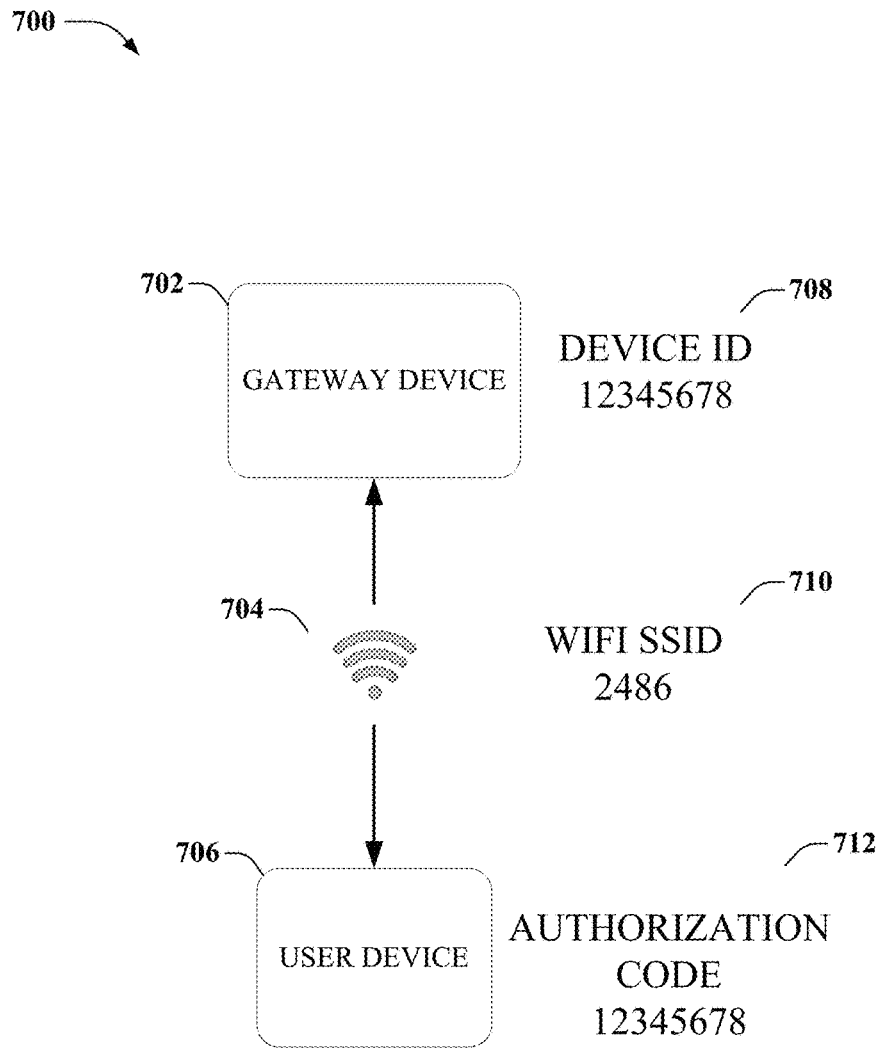
FIG. 7 is an example, non-limiting embodiment of a block diagram showing a device ID and authorization code algorithm in accordance with various aspects described herein.

Turning now to FIG. 7, illustrated is an example, non-limiting embodiment of a block diagram 700 showing a device ID and authorization code algorithm in accordance with various aspects described herein.

When user device 706 connects to the wireless hotspot 704 provided by the gateway device 702, rather than searching for the appropriate wireless network to connect to, a user can enter a single authorization code 12345678 into a configuration application on the user device 706, and the user device 706 can determine which network to connect to, and also successfully be authorized to connect.

In an embodiment, the Wi-Fi SSID 710 for the wireless hotspot 704 can be based on the device ID 708 of the gateway device 702. In an embodiment, if the device ID 708 is 12345678, the WI-FI SSID 710 can be formed from the second, fourth, eighth, and sixth digits of the device ID 708 respectively. Thus, the WI-FI SSID 710 may be 2486. If the user enters the device ID as an authorization code 712 into the user device 706, using the same algorithm, the user device 706 can determine which WI-FI SSID 710 to connect to, and then connect using the passcode 12345678 which is also the device ID of the gateway device 702. This can simplify connecting the user device 706 to the gateway device 702, especially when there may be multiple wireless network to choose from.

It is to be appreciated that the example algorithm described above is merely an exemplary algorithm, and that other combinations and algorithms for determining the SSID from the device ID and or authorization code are possible. It is also to be appreciated that the device ID 708, the WI-FI SSID 710, and the authorization code 712 may include numerical or alphabetical prefixes in some embodiments. In some embodiments, biometric input such as fingerprint information, eye scans, heart rate, can also be included. Furthermore, the authorization code 712 can be based on input received from behavioral activity or a series of taps and/or swipes. It is to be appreciated that the 8-digit-long numerical device ID and the authorization code 712 disclosed herein is merely exemplary and may be different lengths and include other alphanumerical characters in other embodiments.

Figure 8:
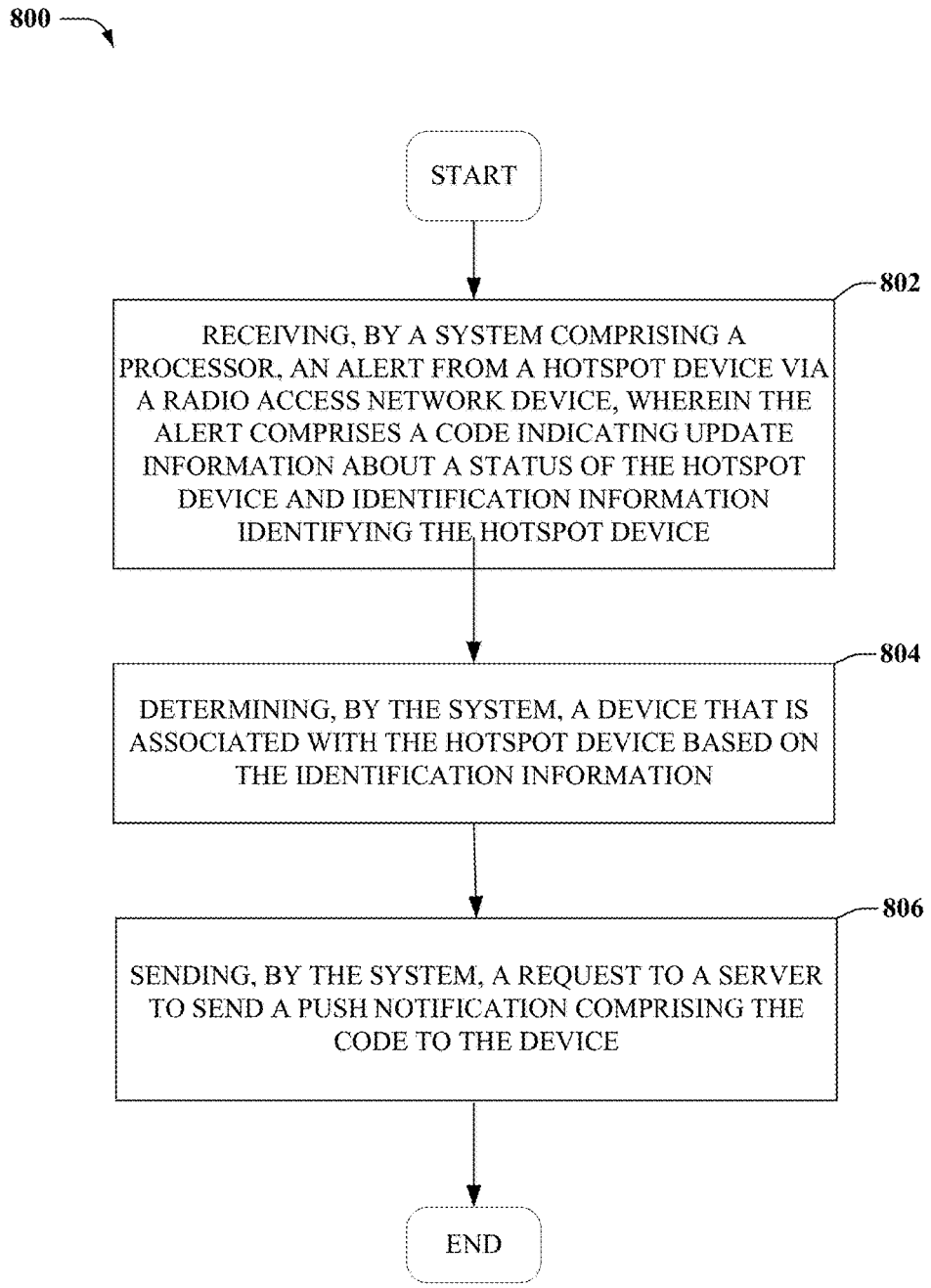
FIG. 8 illustrates a flow diagram of an example, non-limiting embodiment of a method for sending a push notification to a device associated with a gateway device as described herein.

FIG. 8 illustrates a process in connection with the aforementioned systems. The process in FIG. 8 can be implemented for example by the systems 100-700 as illustrated in FIGS. 1-7 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 is a flow diagram of an example, non-limiting embodiment of a method for supporting multiple phone lines as described herein. The method 800 can begin at 802 where the method includes receiving, by a system comprising a processor, an alert from a hotspot device via a radio access network device, wherein the alert comprises a code indicating update information about a status of the hotspot device and identification information identifying the hotspot device.

The method can continue at 804, where the method includes determining, by the system, a device that is associated with the hotspot device based on the identification information. The method can further continue at 806 where the method includes sending, by the system, a request to a server to send a push notification comprising the code to the device.

Figure 9:
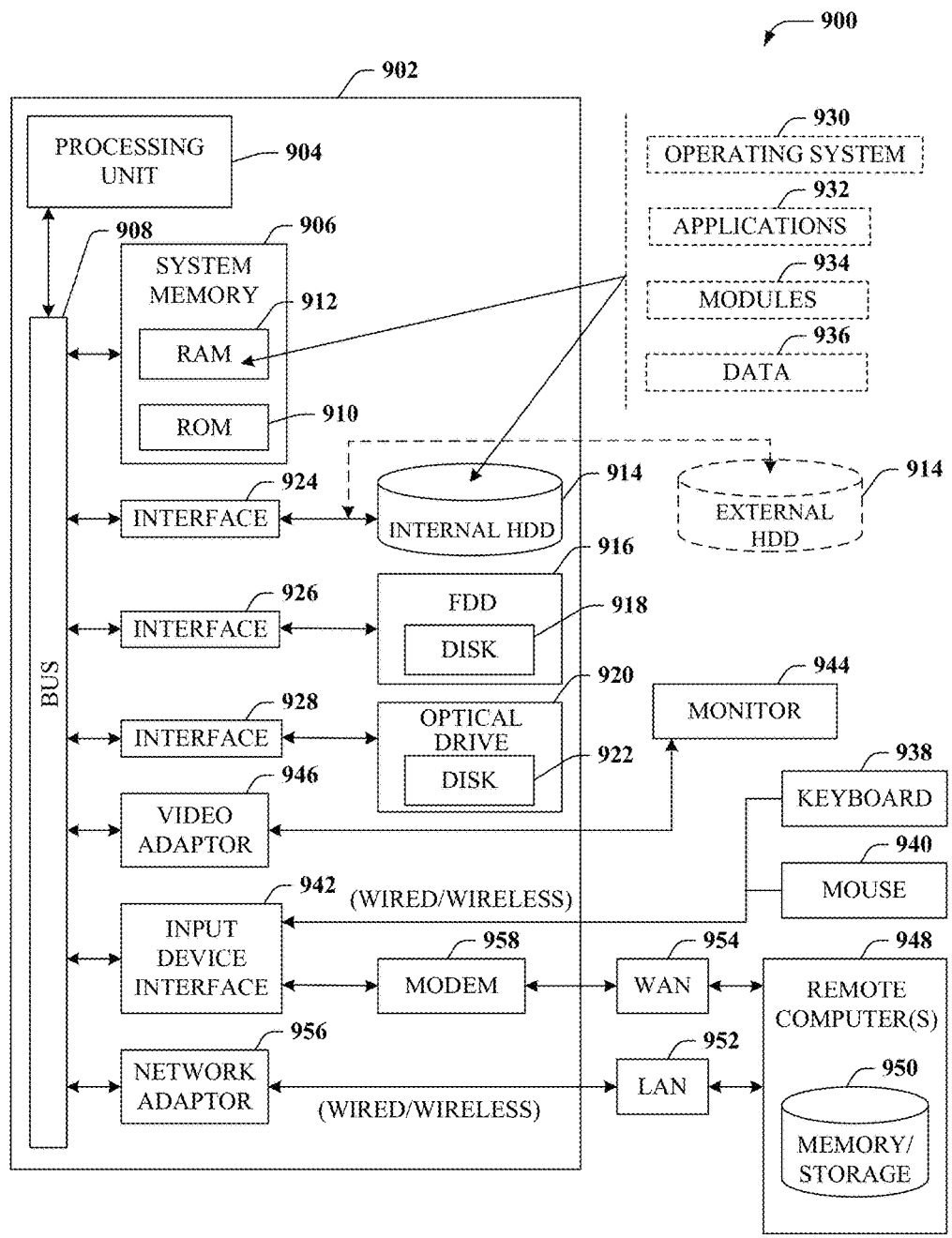
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the mobile access gateway system, user device, or gateway device disclosed in any of the previous systems 100, 200, 300, 400, 500, 600 and/or 700.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), which can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934, and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless AP disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 10:
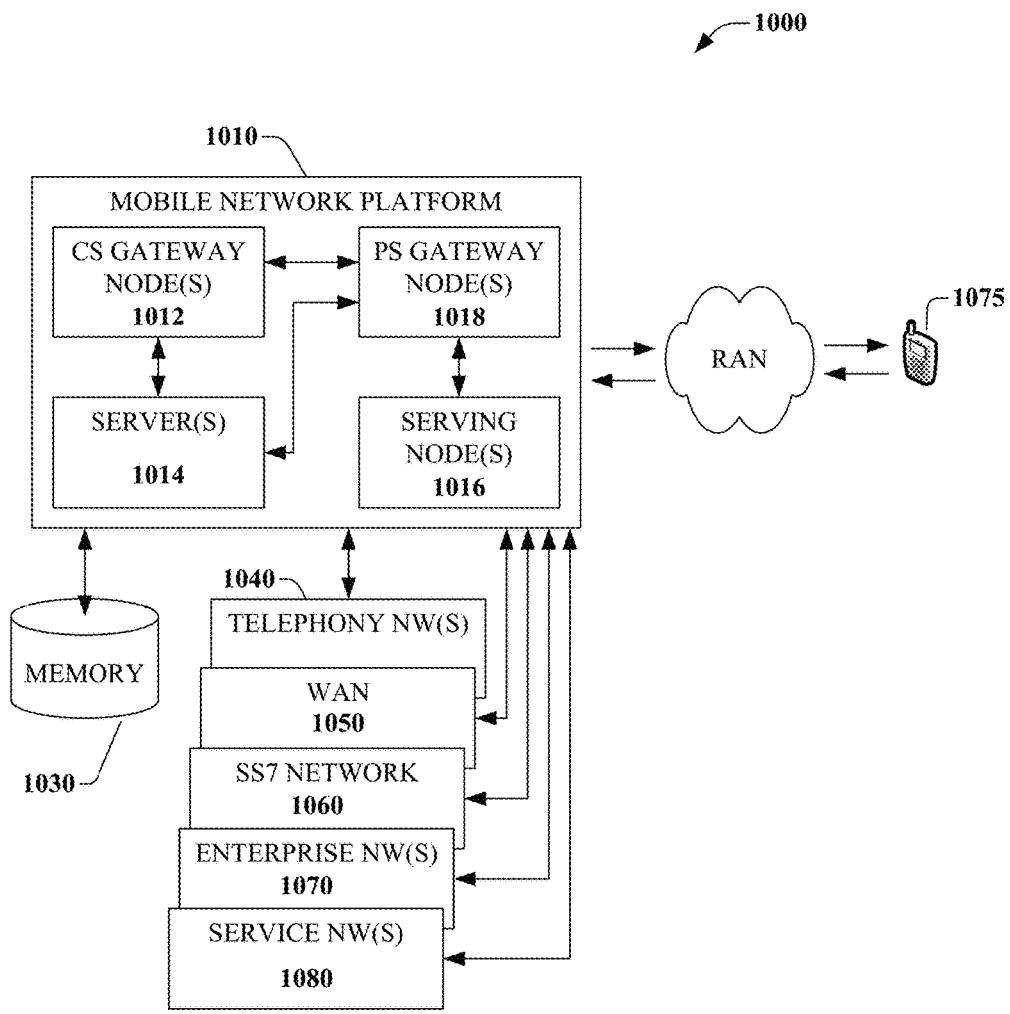
FIG. 10 is a block diagram of an example, non-limiting embodiment of a mobile network platform in accordance with various aspects described herein.

FIG. 10 presents an example embodiment 1000 of a mobile network platform 1010 that can implement and exploit one or more aspects of the disclosed subject matter described herein. Generally, the mobile network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, the mobile network platform 1010 can be included in telecommunications carrier networks, and can be considered carrier-side components as discussed elsewhere herein. The mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1060. Circuit switched gateway node(s) 1012 can authorize and authenticate traffic (e.g., voice) arising from such networks. Additionally, the CS gateway node(s) 1012 can access mobility, or roaming, data generated through the SS7 network 1060; for instance, mobility data stored in a visited location register (VLR), which can reside in the memory 1030. Moreover, the CS gateway node(s) 1012 interfaces CS-based traffic and signaling and the PS gateway node(s) 1018. As an example, in a 3GPP UMTS network, the CS gateway node(s) 1012 can be realized at least in part in gateway GPRS support node(s) (GGSN). It should be appreciated that functionality and specific operation of the CS gateway node(s) 1012, the PS gateway node(s) 1018, and the serving node(s) 1016, is provided and dictated by radio technology(ies) utilized by the mobile network platform 1010 for telecommunication.

In addition to receiving and processing CS-switched traffic and signaling, the PS gateway node(s) 1018 can authorize and authenticate PS-based data sessions with served mobile devices. Data sessions can include traffic, or content(s), exchanged with networks external to the mobile network platform 1010, like wide area network(s) (WANs) 1050, enterprise network(s) 1070, and service network(s) 1080, which can be embodied in local area network(s) (LANs), can also be interfaced with the mobile network platform 1010 through the PS gateway node(s) 1018. It is to be noted that the WANs 1050 and the enterprise network(s) 1070 can embody, at least in part, a service network(s) like IP multimedia subsystem (IMS). Based on radio technology layer(s) available in technology resource(s), the packet-switched gateway node(s) 1018 can generate packet data protocol contexts when a data session is established; other data structures that facilitate routing of packetized data also can be generated. To that end, in an aspect, the PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, the mobile network platform 1010 also includes the serving node(s) 1016 that, based upon available radio technology layer(s) within technology resource(s), convey the various packetized flows of data streams received through the PS gateway node(s) 1018. It is to be noted that for technology resource(s) that rely primarily on CS communication, server node(s) can deliver traffic without reliance on the PS gateway node(s) 1018; for example, server node(s) can embody at least in part a mobile switching center. As an example, in a 3GPP UMTS network, the serving node(s) 1016 can be embodied in serving GPRS support node(s) (SGSN).

For radio technologies that exploit packetized communication, server(s) 1014 in the mobile network platform 1010 can execute numerous applications that can generate multiple disparate packetized data streams or flows, and manage (e.g., schedule, queue, format) such flows. Such application(s) can include add-on features to standard services (for example, provisioning, billing, customer support) provided by the mobile network platform 1010. Data streams (e.g., content(s) that are part of a voice call or data session) can be conveyed to the PS gateway node(s) 1018 for authorization/authentication and initiation of a data session, and to the serving node(s) 1016 for communication thereafter. In addition to application server, the server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through the mobile network platform 1010 to ensure network's operation and data integrity in addition to authorization and authentication procedures that the CS gateway node(s) 1012 and the PS gateway node(s) 1018 can enact. Moreover, provisioning server(s) can provision services from external network(s) like networks operated by a disparate service provider; for instance, the WAN 1050 or Global Positioning System (GPS) network(s) (not shown). Provisioning server(s) can also provision coverage through networks associated to mobile network platform 1010 (e.g., deployed and operated by the same service provider), such as femto-cell network(s) (not shown) that enhance wireless service coverage within indoor confined spaces and offload RAN resources in order to enhance subscriber service experience within a home or business environment by way of the UE 1075.

It is to be noted that the server(s) 1014 can include one or more processors configured to confer at least in part the functionality of the mobile network platform 1010. To that end, the one or more processor can execute code instructions stored in the memory 1030, for example. It should be appreciated that the server(s) 1014 can include a content manager, which operates in substantially the same manner as described hereinbefore.

In example embodiment 1000, the memory 1030 can store information related to operation of the mobile network platform 1010. Other operational information can include provisioning information of mobile devices served through the mobile platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. The memory 1030 can also store information from at least one of the telephony network(s) 1040, the WAN 1050, the enterprise network(s) 1070, or the SS7 network 1060. In an aspect, the memory 1030 can be, for example, accessed as part of a data store component or as a remotely connected memory store.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc., which perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system comprising:
   a processor; and
   a memory that stores instructions that, when executed by the processor, cause the processor to initiate performance of operations comprising:
   receiving a notification request from a gateway device, wherein the notification request comprises a request to send, to a user device, information about a status of the gateway device,
   determining that the user device is associated with the gateway device, and
   initiating sending of a push notification that comprises the information, wherein the push notification is directed to the user device.

2. The system of claim 1, wherein the notification request comprises identification information that identifies the gateway device.

3. The system of claim 2, wherein initiating the sending of the push notification comprises requesting the sending of the push notification from a push notification server, and wherein the push notification is delivered to the user device via a radio access network and via a wireless connection provided by the gateway device.

4. The system of claim 1, wherein the instructions, when executed by the processor, cause the processor to perform operations further comprising:
   determining that a command has been received from the user device; and
   initiating forwarding of the command, via a radio access network, to another device associated with the gateway device.

5. The system of claim 1, wherein the information comprises an indication that a battery level of the gateway device is below a level.

6. The system of claim 1, wherein the information indicates a signal strength of a cellular connection between the gateway device and a cellular network.

7. The system of claim 1, wherein the information indicates that the gateway device has reached a data usage limit.

8. A method comprising:
   receiving, by a computing system that comprises a processor, a notification request from a gateway device, wherein the notification request comprises a request to send, to a user device, information about a status of the gateway device;

determining, by the computing system, that the user device is associated with the gateway device; and initiating, by the computing system, sending of a push notification that comprises the information, wherein the push notification is directed to the user device.

9. The method of claim 8, wherein the determining that the gateway device is associated with the user device comprises comparing authorization information received from the user device to identification information associated with the gateway device.

10. The method of claim 8, further comprising:

determining, by the computing system, that a command has been received from the user device; and initiating, by the computing system, forwarding of the command, via a radio access network, to another device associated with the gateway device.

11. The method of claim 8, wherein the information comprises one indication of a group of indications consisting of:

a first indication of a battery level of the gateway device;

a second indication of a signal strength of a cellular connection between the gateway device and a cellular network; and a third indication that the gateway device has reached a data usage limit.

12. The method of claim 8, wherein initiating the sending of the push notification comprises requesting the sending of the push notification from a push notification server.

13. The method of claim 8, wherein the notification request comprises identification information identifying the gateway device.

14. The method of claim 8, wherein the push notification is sent to the user device via an internet connection provided by the gateway device.

15. The method of claim 14, wherein the gateway device is configured to provide a Wi-Fi hotspot.

16. A computer storage medium comprising instructions that, when executed by a processor, cause the processor to perform operations comprising:

receiving a notification request from a gateway device, wherein the notification request comprises a request to send, to a user device, information about a status of the gateway device;

determining that the user device is associated with the gateway device; and initiating sending of a push notification that comprises the information, wherein the push notification is directed to the user device.

17. The computer storage medium of claim 16, wherein the notification request comprises identification information that identifies the gateway device.

18. The computer storage medium of claim 17, wherein initiating the sending of the push notification comprises requesting the sending of the push notification from a push notification server, and wherein the push notification is delivered to the user device via a radio access network and via a wireless connection provided by the gateway device.

19. The computer storage medium of claim 16, wherein the instructions, when executed by the processor, cause the processor to perform operations further comprising:

determining that a command has been received from the user device; and initiating forwarding of the command, via a radio access network, to another device associated with the gateway device.

20. The computer storage medium of claim 16, wherein the information comprises one indication of a group of indications consisting of:

a first indication of a battery level of the gateway device;

a second indication of a signal strength of a cellular connection between the gateway device and a cellular network; and a third indication that the gateway device has reached a data usage limit.

* * * * *